US006481084B2

(12) United States Patent
Pool et al.

(10) Patent No.: US 6,481,084 B2
(45) Date of Patent: Nov. 19, 2002

(54) METHOD FOR REMOVAL OF A VEHICLE HUB AND ROTOR ASSEMBLY

(75) Inventors: James L. Pool, Clarinda, IA (US); Guy Stolberg, Iron River, MI (US)

(73) Assignee: Lisle Corporation, Clarinda, IA (US)

( * ) Notice: Subject to any disclaimer, the term of this patent is extended or adjusted under 35 U.S.C. 154(b) by 0 days.

(21) Appl. No.: 09/801,466

(22) Filed: Mar. 8, 2001

(65) Prior Publication Data

US 2002/0124376 A1 Sep. 12, 2002

(51) Int. Cl.[7] .................................................. B23P 19/04

(52) U.S. Cl. ........................ 29/426.1; 29/426.5; 29/239; 29/275

(58) Field of Search .......................... 29/402.01, 402.03, 29/426.1, 426.5, 239, 245, 267, 273, 275, 277, 240; 81/464, 466

(56) References Cited

U.S. PATENT DOCUMENTS

| | | | | | |
|---|---|---|---|---|---|
| 3,087,364 | A | * | 4/1963 | Witmer | 29/426.5 |
| 4,965,921 | A | * | 10/1990 | Priest | 29/426.5 |
| 5,103,544 | A | * | 4/1992 | Patterson et al. | 29/275 |
| 5,323,524 | A | * | 6/1994 | Stilwell | 29/426.5 |
| 5,526,722 | A | * | 6/1996 | Limehouse | 81/466 |

* cited by examiner

*Primary Examiner*—David P. Bryant
*Assistant Examiner*—Jermie E. Cozart
(74) *Attorney, Agent, or Firm*—Banner & Witcoff, Ltd.

(57) ABSTRACT

A method for removal of a vehicle hub and rotor assembly from a steering knuckle that includes partially removing the bolts that attach the assembly to the knuckle followed by driving the bolts and the attached assembly from disengagement with the knuckle and subsequent total removal of the bolts thereby releasing the assembly. A special driving tool to effect the driving of the bolts, in particular, flange headed bolts, is depicted.

2 Claims, 4 Drawing Sheets

FIG. 1
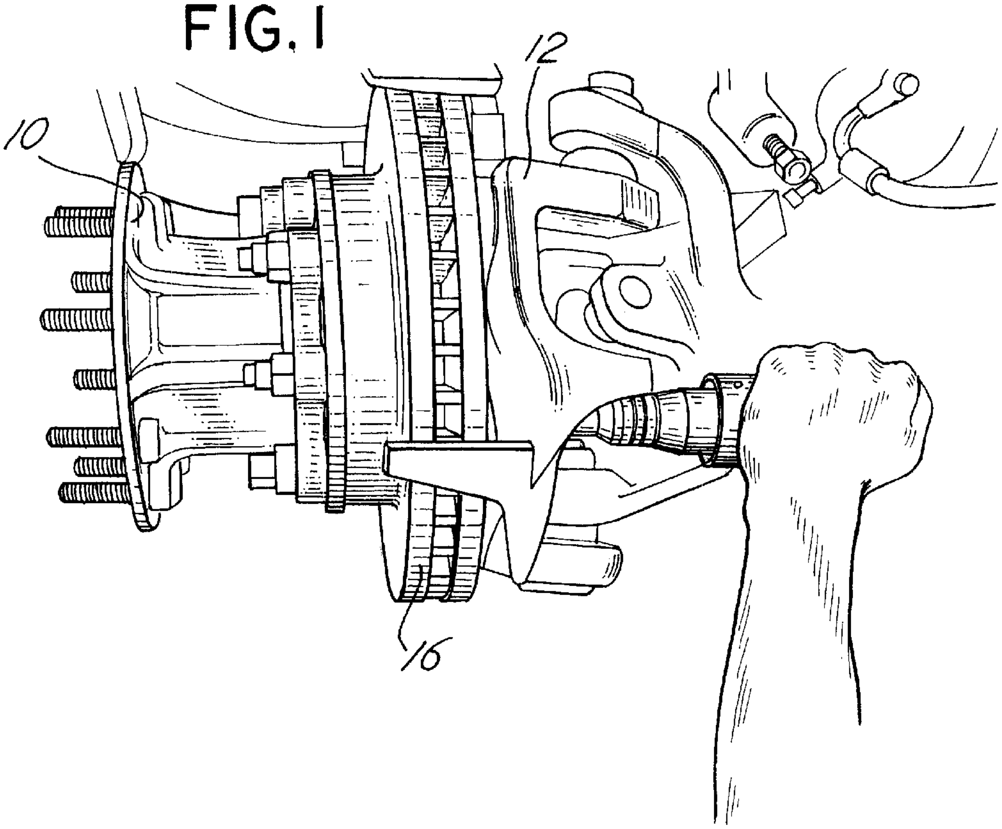
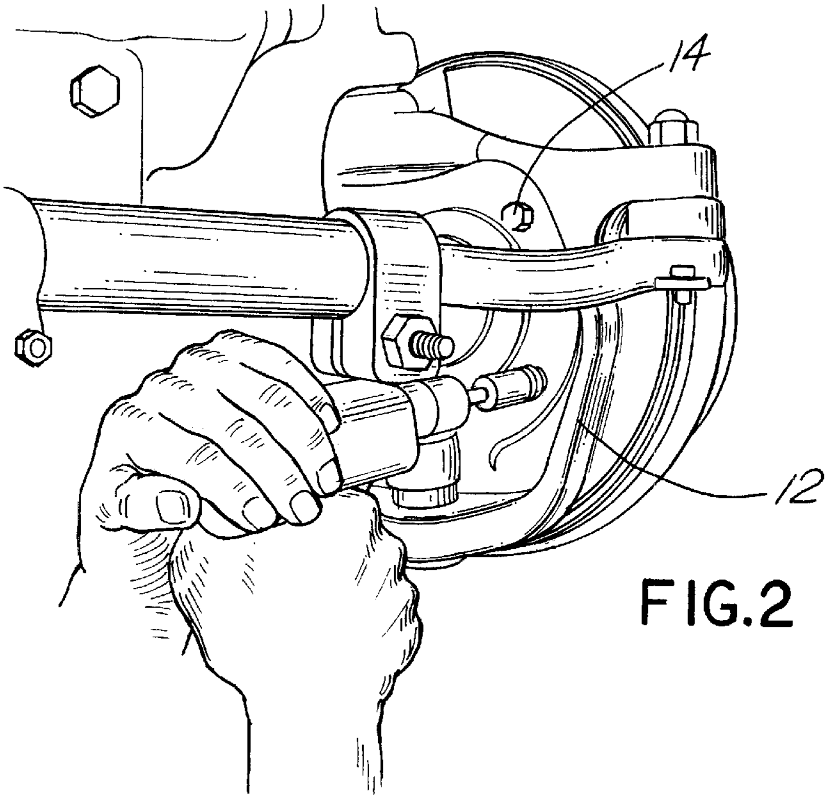
FIG. 2

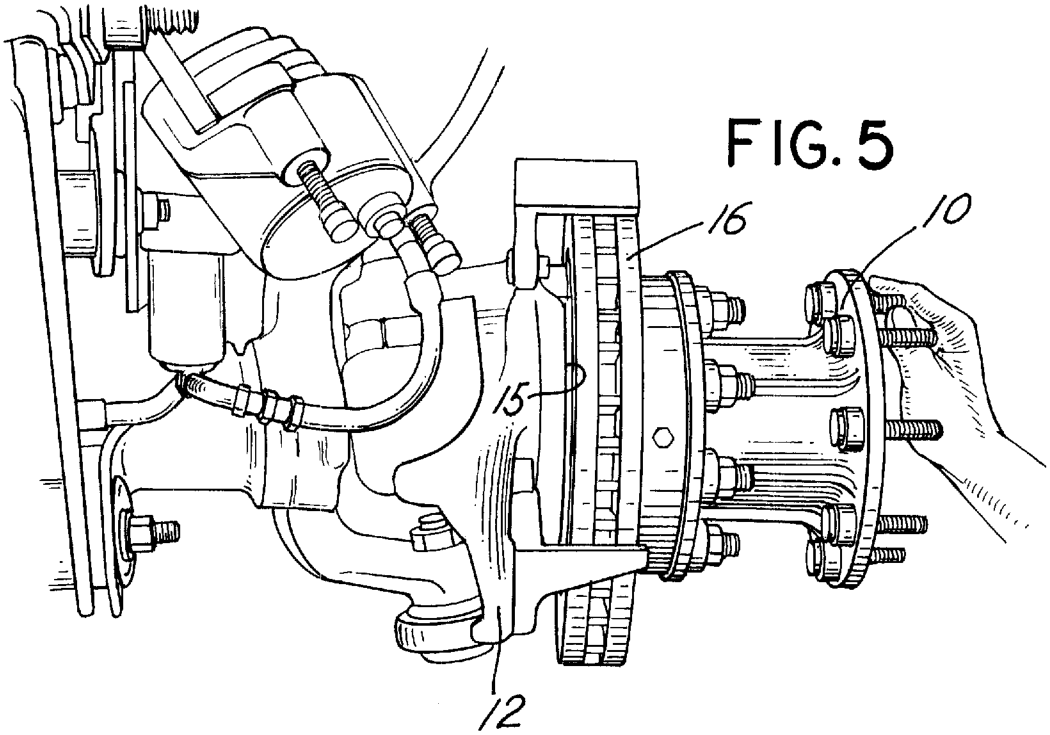
FIG. 5
FIG. 6
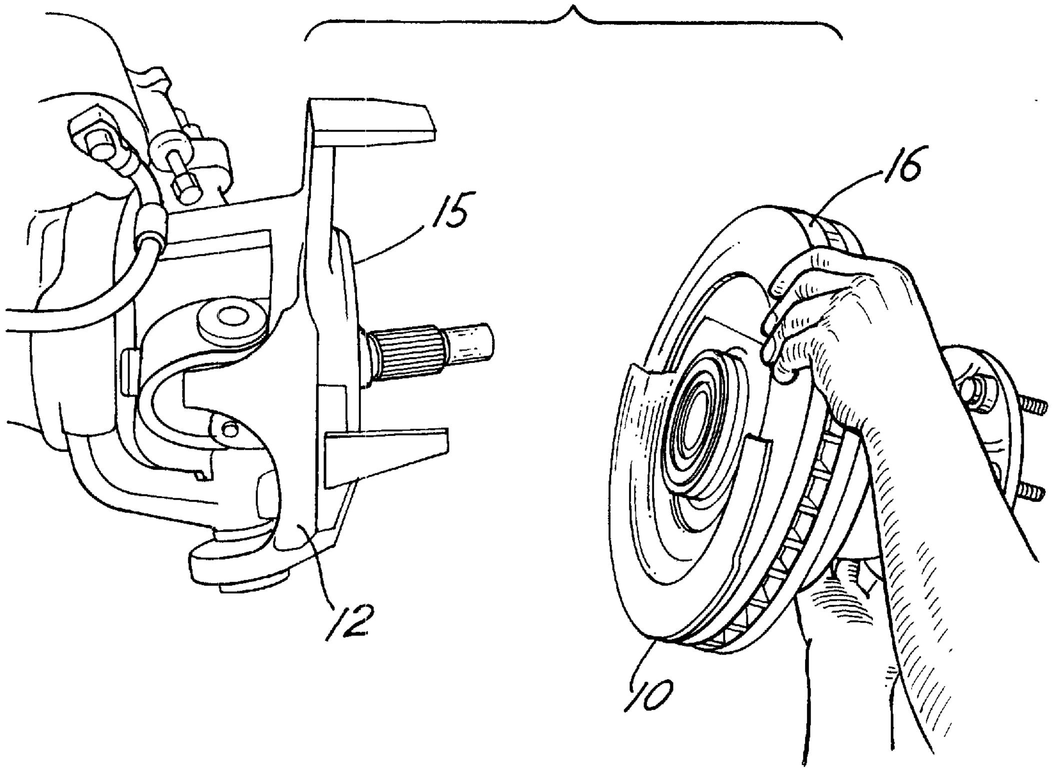

METHOD FOR REMOVAL OF A VEHICLE HUB AND ROTOR ASSEMBLY

BACKGROUND OF THE INVENTION

In a principal aspect, the present invention relates to a method and apparatus for removal of a vehicle hub and rotor assembly from the steering knuckle of a motor vehicle in order to gain access to the drive train and in order to repair and/or replace the hub and rotor assembly.

Most four-wheel drive trucks and other similar vehicles include an independent suspension associated with each of the wheels of the vehicle. The independent suspension typically may include a steering knuckle which comprises a plate for attachment of the vehicle hub and a rotor assembly associated with the braking mechanism for the vehicle and for providing a means to connect the drive train to the hub assembly. It is often necessary, when repairing such vehicles, to remove the hub and rotor assembly from the steering knuckle plate.

The hub and rotor assembly is typically attached to the steering knuckle plate by means of bolts which extend through the knuckle plate and are threaded into openings in the vehicle hub and rotor assembly. Merely removing the bolts and attempting to pull the hub and rotor assembly from the steering knuckle attachment plate of the vehicle suspension system is not typically a successful way to remove such parts from the vehicle. This results because when pulling on the hub and rotor assembly, bearings associated with the assembly may be pulled out of the assembly thereby resulting in additional repair and/or maintenance. Thus, there has developed a need to provide a means and method as well as tools to effect efficient removal of a combined hub and rotor assembly from a steering knuckle plate for replacement or repair.

SUMMARY OF THE INVENTION

Briefly, the present invention comprises an improved method for removal of a vehicle hub and rotor assembly from a steering knuckle of a type which includes at least two flange headed bolts projecting through mounting holes in the steering knuckle and into threaded openings of the hub and rotor assembly to retain the hub and rotor assembly on the steering knuckle. The methodology involves partially removing the flange headed nuts from engagement with the hub and rotor assembly by unthreading or unscrewing the bolts. After the bolts are partially removed from the assembly, then the flange headed bolts are driven, typically by a special impact driver engaged by a pneumatic hammer. The impact driver includes a counterbore at its impact end so that it will fit over the head of the flanged bolt and impact on the flange of the bolt thereby precluding damage to the head of the bolt. Each of the bolts is driven in the manner described to effect separation of the hub and rotor assembly from the knuckle. Thereafter, upon such separation, complete removal is effected by further removal of the bolts from engagement with the assembly by rotation of those bolts to unthread them from the assembly. Preferably, the driver or impact tool, which is driven by a pneumatic hammer, for example, provides for a driving force coaxial with the axis of the bolts.

Thus, it is an object of the invention to provide an improved method for removal of a vehicle hub and rotor assembly from engagement with the steering knuckle of a vehicle.

It is a further object of the invention to provide a method and associated tools for removal of a hub and rotor assembly from a steering knuckle of a vehicle in a manner which will avoid separation of bearings or other parts of the assembly.

It is yet another object of the invention to provide a method for removal of a vehicle hub and rotor assembly from the suspension system of a vehicle in a manner that can be effected quickly with inexpensive and easily accessible tools and in a manner which avoid unnecessary expense and further avoids damage to the hub and rotor assembly.

These and other objects, advantages and features of the invention will be set forth in the detailed description which follows.

BRIEF DESCRIPTION OF THE DRAWING

In the detailed description which follows, reference will be made to the drawing comprised of the following figures:

FIG. 1 is a perspective view of a typical vehicle hub and rotor assembly wherein a vehicle technician is initially partially removing the bolts associated with the steering knuckle that retains the hub and rotor assembly attached to the steering knuckle;

FIG. 2 is a perspective view of the step of partially removing the retention bolts depicted in FIG. 1;

FIG. 5 is a perspective view depicting the result of driving the retention bolts in accord with the process of FIG. 4;

FIG. 6 is a perspective view of the vehicle hub and rotor assembly upon subsequent removal of the bolts from the assembly subsequent to the step of FIG. 5;

DESCRIPTION OF THE PREFERRED EMBODIMENT

Figure 3:
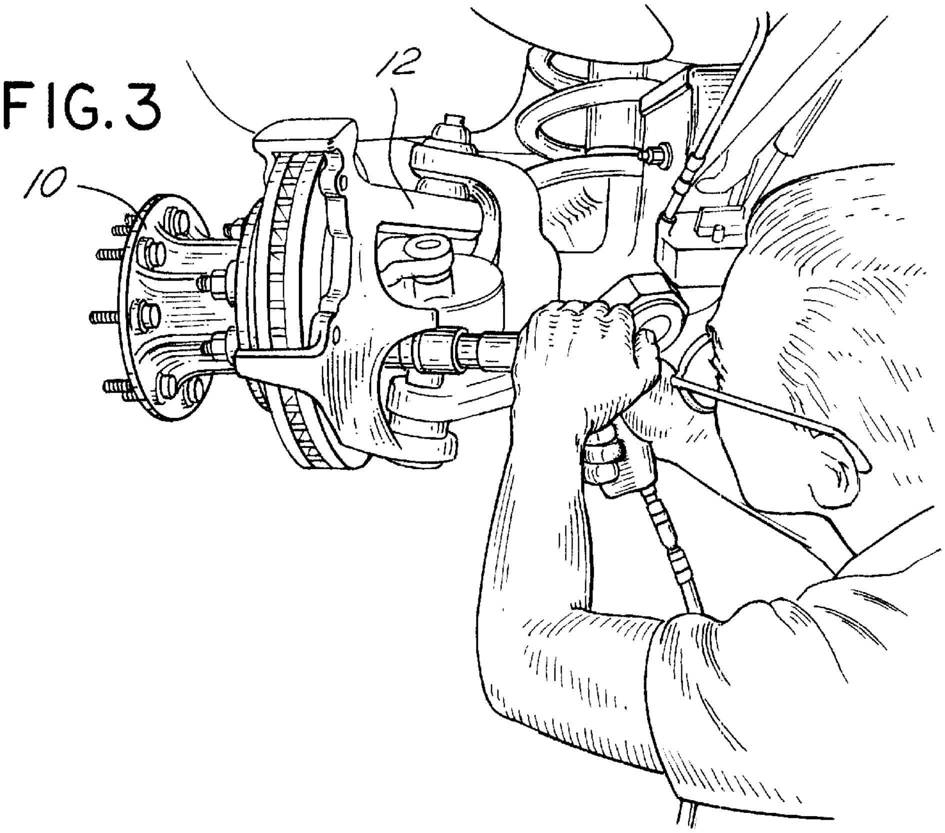
FIG. 3 is a further perspective view of the step of partially removing the bolts depicted in FIG. 1.

In FIG. 1, a vehicle hub and rotor assembly 10 is depicted as attached to the steering knuckle 12 associated with a vehicle suspension system, and more particularly with a front wheel of a vehicle. The steering knuckle 12 includes a plate 15 (see FIG. 6) and, when associated with a four-wheel drive vehicle, includes a center drive shaft (not shown) which fits through the knuckle 12 and engages with the hub assembly 10 to drive a wheel (not shown) attached thereto. Hub and rotor assembly 10 thus provide a means for attaching a driven wheel to a vehicle. In addition, a rotor portion of the assembly 10 is associated with a disc of a disc brake which operates in conjunction with brake pads mounted on the knuckle 12.

It is often desirable to remove the hub and rotor assembly 10 for repair or replacement. Removal of the assembly 10 from the knuckle 12 is typically attempted by removing four flange headed bolts 14 that pass through the backside of the knuckle 12 and engage a fixed housing associated with the hub assembly 10. Mere removal of the flanged bolts 14, however, followed by pulling of the hub assembly 10 away from the steering knuckle 12 often results in dislodgement and disengagement of the housing 16 of the hub assembly 10 from the remaining component parts thereby causing, inter alia, the bearings of the assembly 10 to become disengaged. Thus, the assembly 10 does not typically separate easily from the knuckle 12 as an integral single element or assembly 10.

Figure 4:
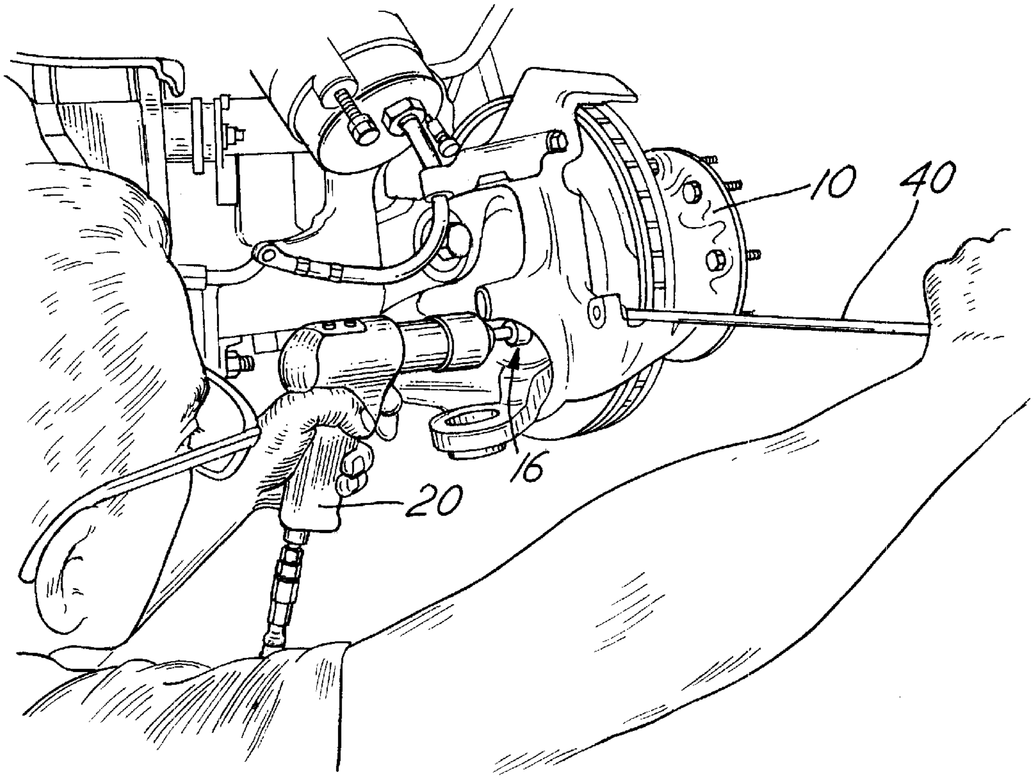
FIG. 4 is a perspective view of the subsequent step of driving the retention bolts that have been partially removed from the vehicle hub and rotor assembly by means of an air hammer in combination with a special driving tool.
Figure 7:
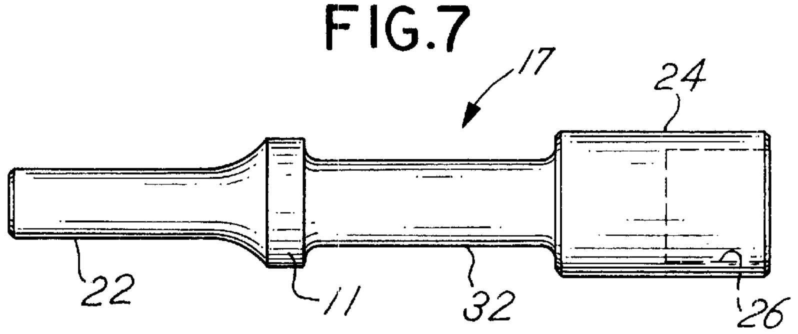
FIG. 7 is a plan view of the driving tool used to drive the bolts that retain the vehicle hub and rotor assembly.
Figure 8:
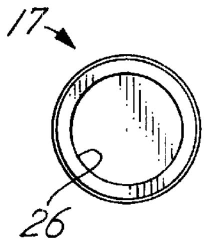
FIG. 8 is an end view of the driving tool of FIG. 7.
Figure 11:
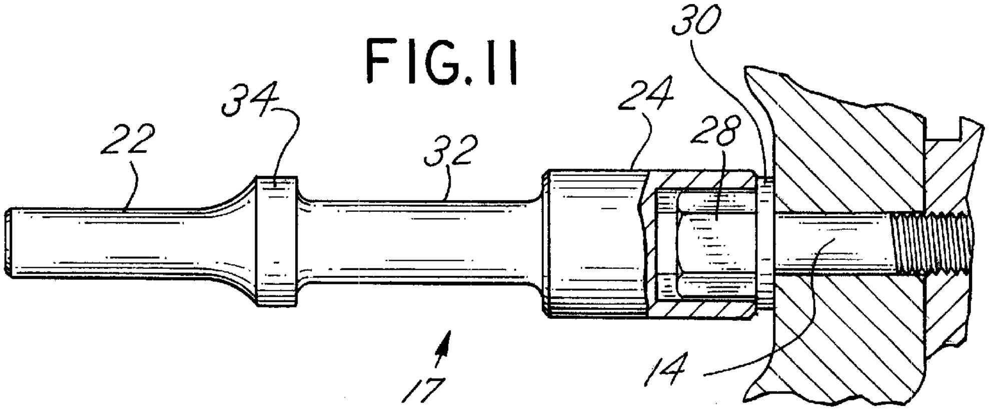
FIG. 11 is an enlarged plan view of the driving tool of FIGS. 7 and 8 illustrating the manner in which it engages with the retention bolts.

In order to overcome this difficulty, the flanged bolts 14 in FIG. 11 are initially partially withdrawn or disengaged from the hub assembly 10, for example, by a pneumatic wrench as depicted in FIGS. 2 and 3. Thus, the flanged bolts 14 are in effect unscrewed, but only partially so. Subsequently, as illustrated in FIG. 4, a special driver 17 (in FIG. 11) is impacted against each of the separate bolts 14. In this manner, the entire hub assembly 10 is separated from the steering knuckle 12. FIG. 5 illustrates how the entire housing of the hub assembly 10 is separated from the steering knuckle 12 inasmuch as there is depicted a space between those component parts. Note that the bearings associated with the hub assembly 10 are retained in the housing 16 and are not disengaged from the housing 16 (see FIG. 6). The entire assembly 10 thus separates from plate 15 as a uniform element. Upon such subsequent separation, as depicted in FIG. 6, the bolts 14 may be entirely removed from engagement with the assembly 10 by unscrewing them thus permitting removal of the assembly 10 from the knuckle 12.

The special tool 17 which is driven by a pneumatic hammer 20 in FIG. 4 is a tool 16 which includes a driving end 22 and a bolt engaging end 24. The bolt engaging end includes a counterbore 26 so that the end 24 may fit over the head 28 of bolt 14 and engage against the peripheral flange 30 thereof. This clearance, so as to engage the flange 30, prevents damage to the shaped head 28 which typically has a polygonal shape for easy rotational driving by means of a tool. The driving end 24 of tool 16 is connected by a rod 32 to a contoured driving end 22. The driving end 22 includes flange 34 to facilitate driving in an axial direction of the tool 17. Preferably, the tool 17 is driven by the pneumatic hammer 20 coaxially with the axis of the bolt 14.

Figure 9:
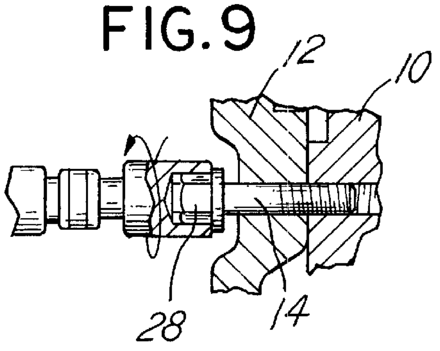
FIG. 9 is a schematic illustration of the step of partially removing the retention bolts which hold the vehicle hub and rotor assembly engaged with a steering knuckle.
Figure 10:
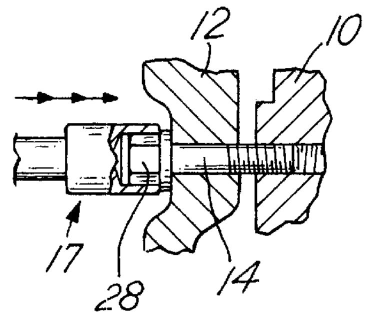
FIG. 10 illustrates the further step of driving the bolts with a special driving tool of the type depicted in FIGS. 7 and 8.

FIGS. 9 and 10 illustrate schematically the series of steps to practice the invention including the first step of partially unscrewing or removing the bolts 14 followed by a subsequent step in FIG. 10 of driving the bolts 14 with the tool 17 as as to separate the entire hub assembly 10 from the steering knuckle 12. The separation of the hub and rotor assembly 10 from the steering knuckle 12 may be augmented by using a lever bar, for example, as depicted in FIG. 4 wherein lever bar 40 is used to facilitate movement of the assembly 10.

It is possible to vary the method and tools without departing from the spirit and scope of invention. For example, rather than using pneumatic tools, it is possible to use hand tools to effect driving and rotational movement of the bolts in this sequence depicted. Most preferably, however, a driving tool 17 of the type depicted in the figures is preferred inasmuch as it facilitates the coaxial driving force on the bolts 14 and further provides for impact on the flanges 30 associated with the bolts 14 so as to enable those bolts 14 to be reused and to remain undamaged. Thus, the invention is to be limited only by the following claims and equivalents thereof.

What is claimed is:

1. A method for removal of a vehicle hub and rotor assembly from a steering knuckle wherein at least two flange headed bolts project through mounting holes in the steering knuckle and engage by threaded engagement into threaded openings in the hub and rotor assembly to retain the hub and rotor assembly mounted on the steering knuckle, said method comprising, in combination, the steps of:

partially removing the flange headed bolts by rotation from the threaded engagement with the threaded openings of the hub and rotor assembly;

driving the flange headed bolts with an impact driver having an impact end and a drive end, said impact end including a counterbore to fit over the bolt head and engage against the bolt flange to thereby separate the hub and rotor assembly from the steering knuckle;

completely removing the flanged bolts from the hub and rotor assembly by rotation of the flange headed blots; and removal of hub and rotor assembly from the steering knuckle.

2. The method of claim 1 wherein the impact driver drive end includes a shaft coaxial with the counterbore and a peripheral flange, and wherein the driver and flange headed bolts are generally coaxial when the bolts are driven by the impact driver.

* * * * *